Patented July 30, 1935

2,009,807

UNITED STATES PATENT OFFICE 2,009,807

PROCESS FOR PRODUCING A MATERIAL FOR PROTECTING SURFACES AGAINST RUST, DECOMPOSITION, HEAT, FIRE, AND THE LIKE

Andor Kutas, Budapest, Hungary, assignor to the firm Victoria Vegyeszeti Muvek R. T., Budapest, Hungary No Drawing. Application September 6, 1930, Serial No. 480,180. Renewed June 10, 1935. In Hungary January 29, 1930

7 Claims. (Cl. 134—58)

The subject of the invention is a process for producing a material for protecting surfaces of metal (for example iron), wood and the like against rust, decomposition, heat and fire.

The coating of the surface with pigment, particularly with an earth pigment, for example ochre, only imparts to the surface a colouration but no protection. Certain metallic oxides (oxide of iron, oxide of lead) afford certainly some incomplete protection against corrosion, but they are quite useless against decomposition, heat, and more particularly against fire.

Minium (red oxide of lead, more correctly plumbous orthoplumbate), which is considered the best protection against rust, is not entirely satisfactory for this purpose.

A protecting material for surfaces which is superior to all known materials for this purpose can, according to the invention, be manufactured from bauxite, an ore containing its characteristic constituents (aluminium-, iron-, titanic oxide and silicic acid) in colloidal form and in which the aluminium oxide in completely amorphous.

It is found by experience that every bauxite is not adapted in the same degree for producing the protecting material.

More especially, the bauxites found in the Vertes Mountains in Hungary, in the neighbourhood of the Community of Gant, answer the required conditions. Of these, one variety which I have found particularly advantageous differs considerably from the usual red or violet bauxite and is distinguished by its characteristic light brown colour. This bauxite has more particularly the colloidal form and is called "gantite".

When bauxite is subjected to firing or drying, calcining or sintering, or after being exposed to more than one of these treatments in succession, and then pulverized and sifted or washed, it forms an excellent material which, when mixed with a paint vehicle such as an oil (varnish), adheres air tight to the surface coated therewith, and in an ideal manner protects the surface against corrosion and decomposition as well as against heat and fire.

If water-glass (sodium silicate) is added, the protection of the coated surface against heat and fire is quite complete.

In many raw bauxites there are, however, substances which dissolve in weak acids after a long time. For example, the carbonic acid in the atmosphere dissolves these easily soluble constituents after a long time. The result is that the continuous film formed by the varnish in time shows small microscopic holes at which the protection fails and the carbonic acid of the air exerts its corroding action. In order to prevent this action, the dried and pulverized bauxite is treated for 2–3 hours in a mixing vessel with dilute hydrochloric acid, filtered, and washed to remove the above mentioned soluble constituents. This acid treatment merely removes those easily soluble constituents which are subject to weathering, for example the constituents which are dissolved in time by atmospheric carbon dioxide. The acid is sufficiently dilute so that the characteristic constituents of bauxite, such as iron and titanium are not removed. The washed pulp is then again dried, heated to 600°–700° C., comminuted, finely ground in a suitable milling apparatus and passed through a sieve, without washing. In the absence of the above-mentioned easily soluble constituents, it is not necessary to chemically treat the bauxite.

A suitable coating composition within my invention can be produced if 100 parts of bauxite, prepared as above, are mixed with about 80 parts of varnish or with 80 parts of varnish and about 5 parts of a drier or with 120 parts of water glass, so as to form a homogeneous film. A substance coated with this film is protected not only against air, but also against acids, hydrogen sulphide, sulphur dioxide, etc.

What I claim is:

1. The process of manufacturing a purified bauxite in amorphous form for use as a basic substance in paints, which consists in drying and pulverizing the bauxite and treating it for two to three hours with dilute hydrochloric acid in such manner as to remove water soluble substances, only filtering and washing to form a pulp material, drying the so-treated bauxite and heating at 600 to 700° C., and then finally grinding the residue; said residue still containing substantially the original content of iron and titanium.

2. The process which comprises drying and pulverizing natural bauxite, acid treating with a mild acid for removal of constituents subject to weathering only, calcining, grinding and mixing with a paint vehicle.

3. The process of preparing bauxite for use in admixture with a paint vehicle as a corrosion resistant and fire proofing coating composition, which comprises pulverizing and drying natural colloidal bauxite, subjecting the bauxite to a mild acid treatment for removal of constituents subject to weathering, calcining at about 600° to 700° C., grinding and screening; the resulting product containing substantially the original content of aluminum, iron, titanium and silicon but being free from easily soluble constituents subject to weathering.

4. The process of preparing bauxite in admixture with a paint vehicle as a corrosion resistant and fire proofing coating composition, which comprises pulverizing and drying natural colloidal bauxite, subjecting the bauxite to a mild acid treatment for removal of constituents subject to weathering, calcining at about 600° to 700° C., grinding and mixing the resulting product, which contains substantially the original content of aluminum, iron, titanium and silicon, with water-glass as a paint vehicle.

5. The process which comprises drying and pulverizing natural bauxite, acid treating for removal of constituents subject to weathering, calcining, grinding and mixing about 100 parts by weight of the so-treated bauxite, which contains substantially its original content of aluminum, iron and titanium, with about 120 parts by weight of water-glass.

6. The process of preparing bauxite in admixture with a paint vehicle as a corrosion resistant and fire proofing coating composition, which comprises pulverizing and drying natural colloidal bauxite, subjecting the bauxite to a mild acid treatment for removal of constituents subject to weathering, calcining at about 600° to 700° C., grinding and mixing the resulting product, which contains substantially the original content of aluminum, iron and titanium, with a varnish as a paint vehicle.

7. The process of preparing bauxite for use in admixture with a paint vehicle as a corrosion resistant and fire proofing coating composition, which comprises drying and pulverizing natural colloidal bauxite, subjecting it to a mild acid treatment for removal of only those constituents subject to weathering without substantial removal of iron and titanium, calcining and grinding.

ANDOR KUTAS.